US 012457676B2

(12) United States Patent
Louvrier et al.

(10) Patent No.: US 12,457,676 B2
(45) Date of Patent: Oct. 28, 2025

(54) CATHODE SUPPLY ASSEMBLY

(71) Applicant: GE Precision Healthcare LLC, Waukesha, WI (US)

(72) Inventors: Yannick Louvrier, Yvelines (FR); Julien Nicolle, Yvelines (FR); Jean Luc Josse, Yvelines (FR); Antonio Caiafa, Waukesha, WI (US)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 224 days.

(21) Appl. No.: 18/484,284

(22) Filed: Oct. 10, 2023

(65) Prior Publication Data
US 2025/0120004 A1    Apr. 10, 2025

(51) Int. Cl.
*H05G 1/10* (2006.01)
*A61B 6/00* (2006.01)
*A61B 6/10* (2006.01)
*H05K 9/00* (2006.01)

(52) U.S. Cl.
CPC ............... *H05G 1/10* (2013.01); *A61B 6/107* (2013.01); *A61B 6/54* (2013.01); *A61B 6/56* (2013.01); *H05K 9/002* (2013.01); *H05K 9/005* (2013.01)

(58) Field of Classification Search
CPC ... A61B 6/10; A61B 6/107; A61B 6/56; H01J 35/02; H01J 35/025; H01J 35/16; H01J 2235/00; H01J 2235/02; H01J 29/003; H01J 29/96; H01J 29/98; H05G 1/04; H05G 1/26
See application file for complete search history.

(56) References Cited

U.S. PATENT DOCUMENTS

| 4,823,250 | A | 4/1989 | Kolecki et al. |
|---|---|---|---|
| 8,929,513 | B2 | 1/2015 | Vadivel et al. |
| 9,253,864 | B2 | 2/2016 | Caiafa et al. |
| 9,930,765 | B2 | 3/2018 | Louvrier et al. |
| 10,692,684 | B2 | 6/2020 | Caiafa et al. |
| 2018/0240638 | A1 | 8/2018 | Teague |
| 2019/0150256 | A1 | 5/2019 | Louvrier et al. |
| 2019/0182943 | A1* | 6/2019 | Steck ............. H05G 1/06 |

FOREIGN PATENT DOCUMENTS

WO    2013083879 A2    6/2013

* cited by examiner

*Primary Examiner* — Don K Wong
(74) *Attorney, Agent, or Firm* — McCoy Russell LLP

(57) ABSTRACT

Systems are provided for a medical imaging system. In one example, an electronic assembly configured to control a cathode of an X-ray tube of the medical imaging system comprises a plurality of boards comprising a first analog board, a first digital board, a second power board, and a third power board, and at least two Faraday cages nested within one another, the at least two Faraday cages comprising an inner Faraday cage surrounding the first digital board and an outer Faraday cage surrounding each of the plurality of boards and the inner Faraday cage.

20 Claims, 10 Drawing Sheets

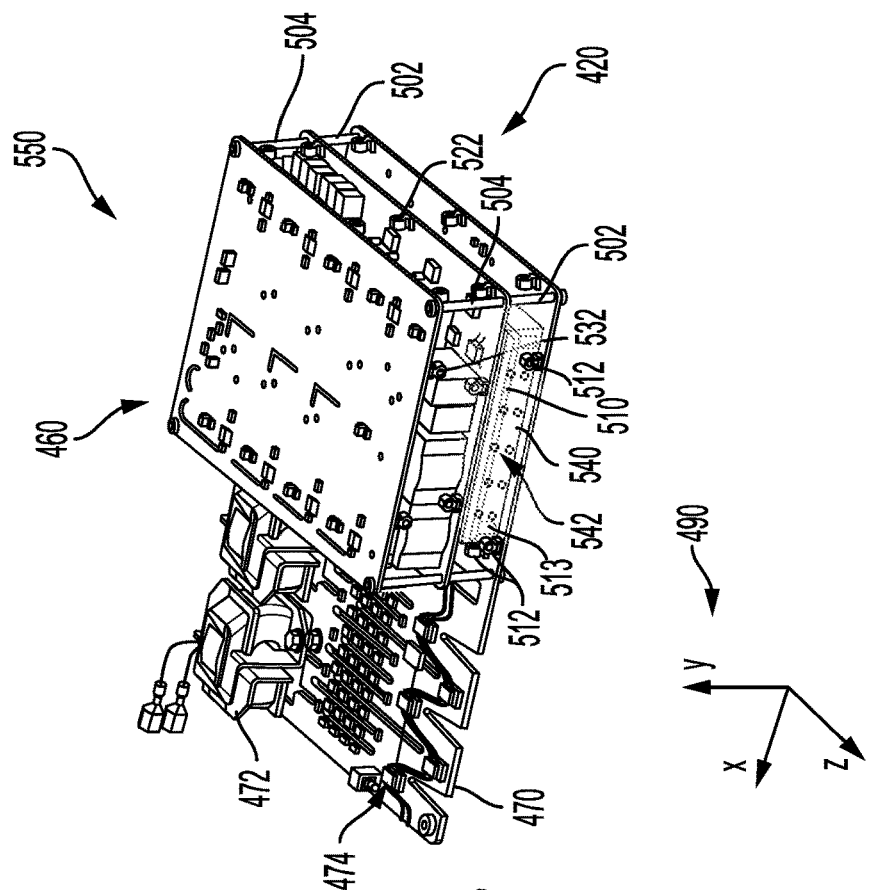
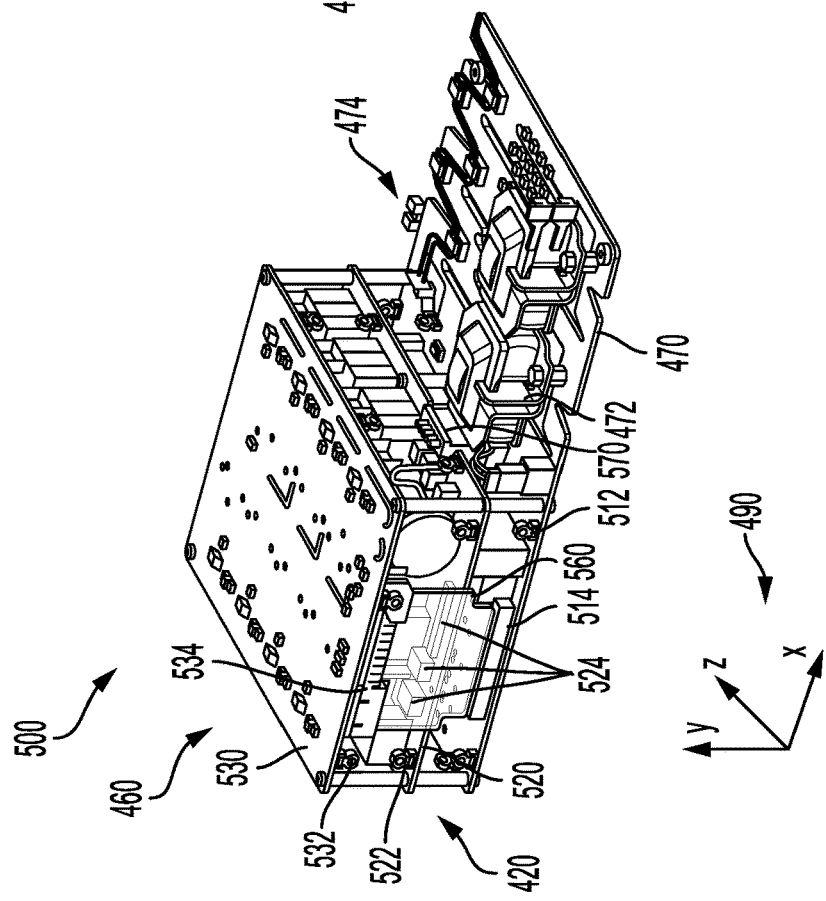
FIG. 5B
FIG. 5A

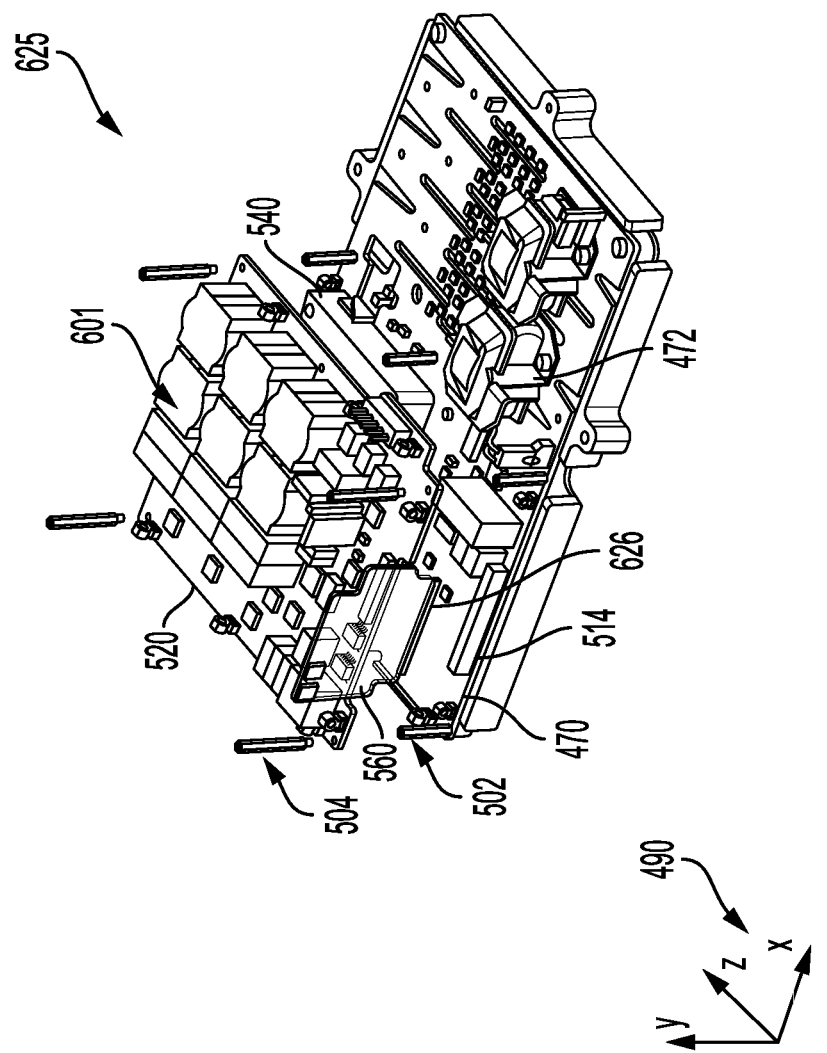
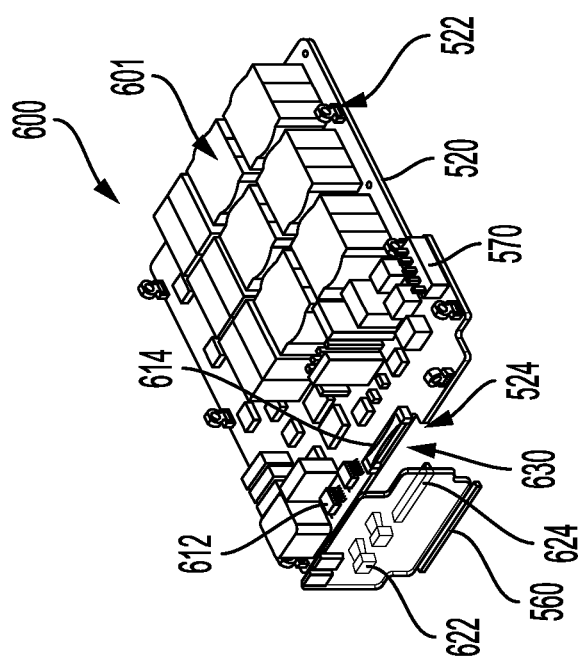
FIG. 6B
FIG. 6A

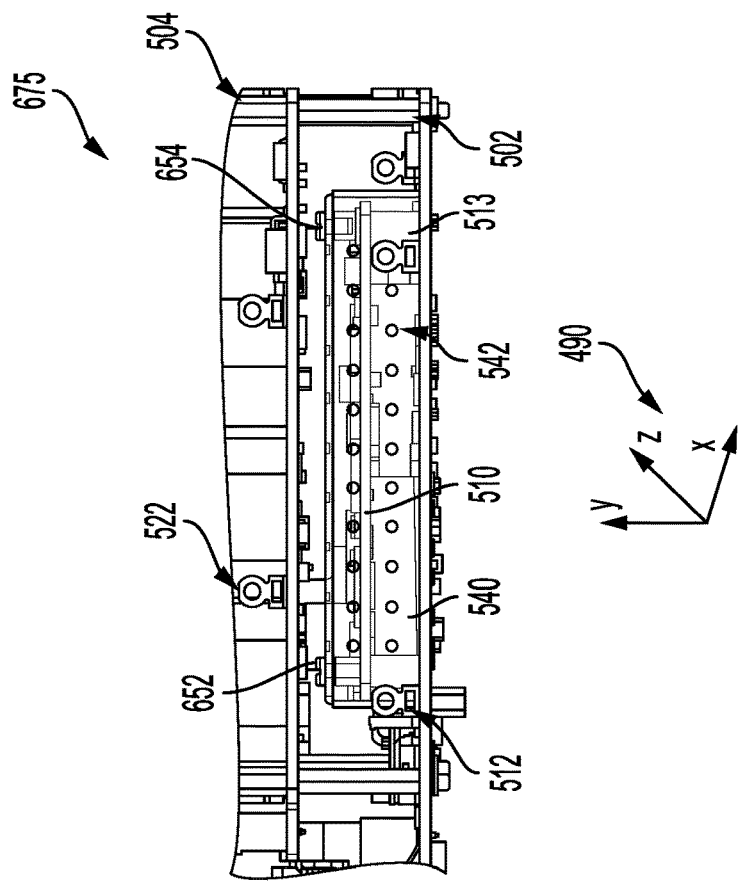
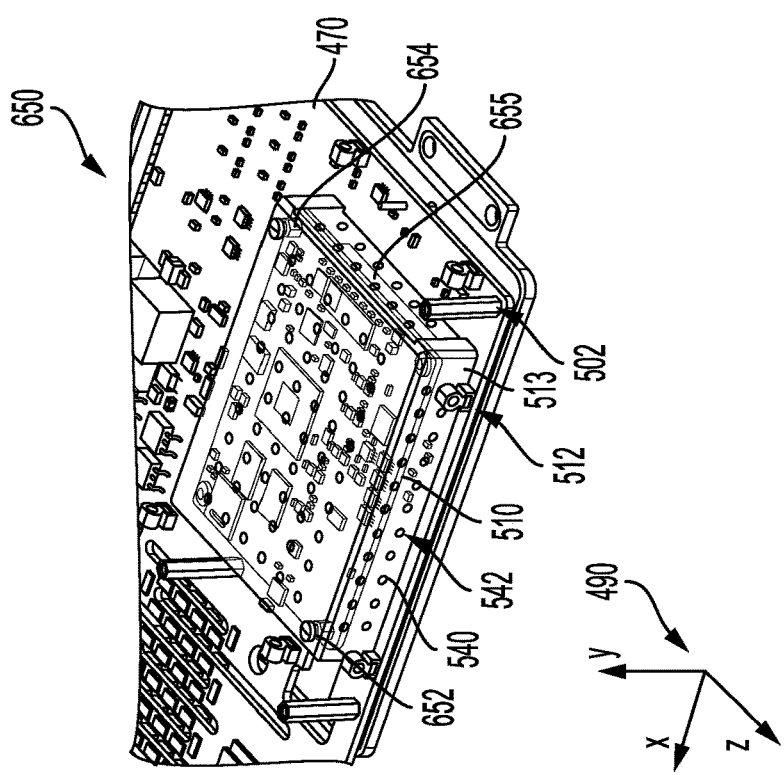
FIG. 7B
FIG. 7A

CATHODE SUPPLY ASSEMBLY

FIELD

Embodiments of the subject matter disclosed herein relate to medical imaging systems, and more particularly, to X-ray based medical imaging systems.

BACKGROUND

X-ray tubes and imaging systems may be used in a variety of applications to scan objects and reconstruct one or more images of the object. For example, in computed tomography (CT) imaging systems and interventional imaging systems, an X-ray source emits an X-ray beam toward a subject or an object, such as a patient or a piece of luggage. The beam, after being attenuated by the subject, impinges upon an array of radiation detectors. The intensity of the attenuated beam radiation received at the detector array is typically dependent upon the attenuation of the X-ray beam by the subject. Each detector element of a detector array produces a separate electrical signal indicative of the attenuated beam received by each detector element. The electrical signals are transmitted to a data processing system for analysis. The data processing system processes the electrical signals to facilitate generation of an image.

In general, in such imaging systems, the X-ray source and the detector array are rotated within an imaging plane and around the subject. Furthermore, the X-ray source generally includes an X-ray tube, which emits the X-ray beam at a focal point. The X-ray tube may include one or more emitters from which an electron beam is emitted toward a target in response to heat resulting from an applied electrical current via the thermionic effect. The emitter may be configured as a cathode and the target as an anode, with the target at a substantially higher positive voltage (which may be at ground) than the emitter (which may be at a negative voltage) to create an electric field and allow transmission of an electron beam. In response to the electron beam impinging on the target, the target emits X-rays. The cathode may include one or more electrodes used to set local electric fields (and/or magnets to set local magnetic fields) on the emitting structure to control intensity, focusing, and direction of the electron beam. An electronic generator, also included in the X-ray source, is used to provide high voltage between the cathode and the anode of the tube, control the rotation of the anode and control the cathode (e.g., provide heating current to the emitter(s) and voltage to the electrode(s)).

BRIEF DESCRIPTION

In one example, an electronic assembly configured to control a cathode of an X-ray tube of a medical imaging system includes a plurality of boards comprising a first analog board, a first digital board, a second power board, and a third power board, and at least two Faraday cages nested within one another, the at least two Faraday cages comprising an inner Faraday cage surrounding the first digital board and an outer Faraday cage surrounding each of the plurality of boards and the inner Faraday cage.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below:

FIGS. 5A and 5B show the cathode supply assembly without the outer Faraday cage.

FIG. 6A is a view of a power board with an interconnecting board.

FIG. 6B is a view of the power board being coupled to a first analog board and a first digital board.

FIGS. 7A and 7B are views of an inner Faraday cage surrounding the first digital board coupled to the first analog board.

DETAILED DESCRIPTION

Figure 1:
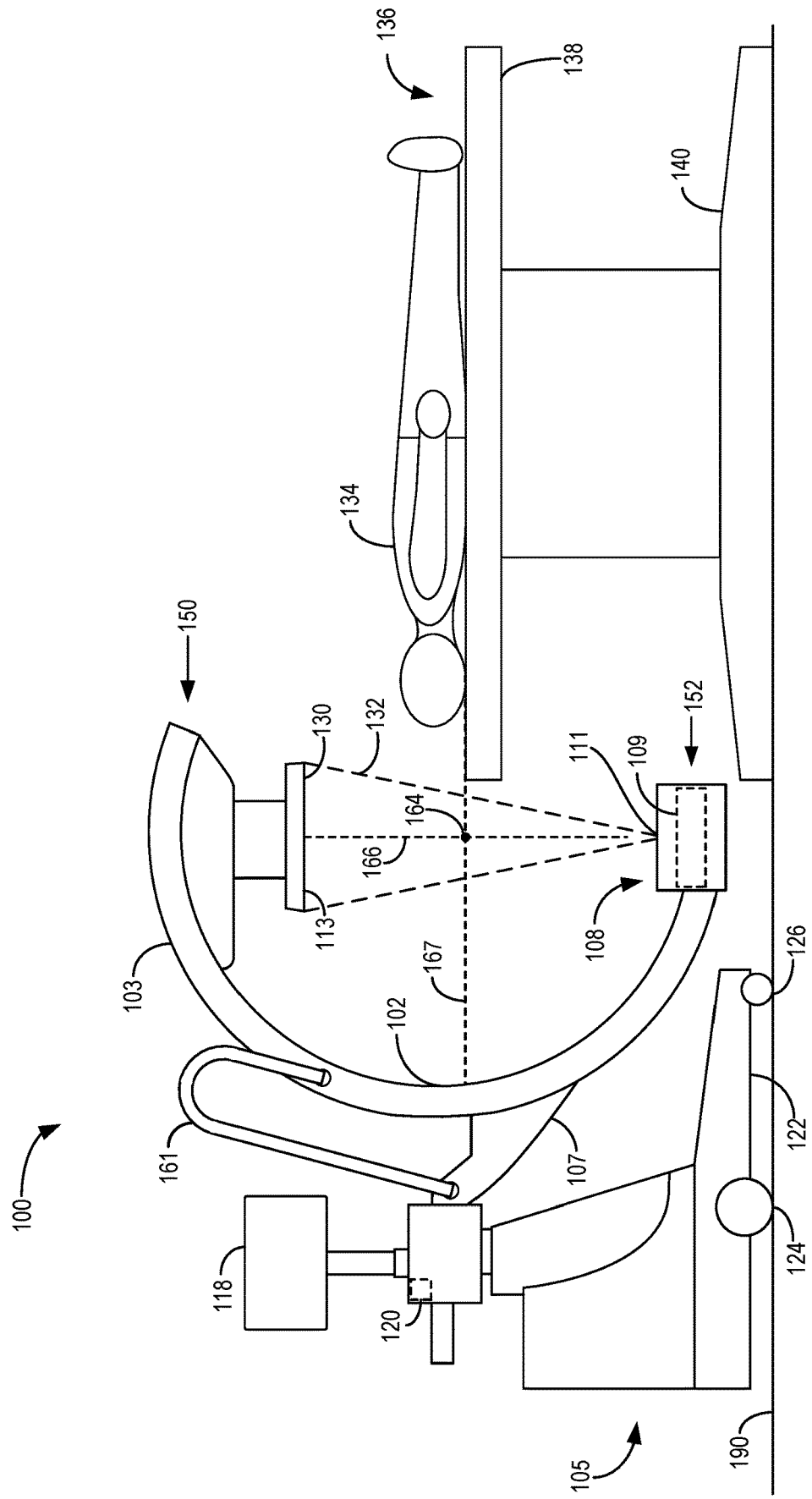
FIG. 1 shows an example medical imaging system.
Figure 2:
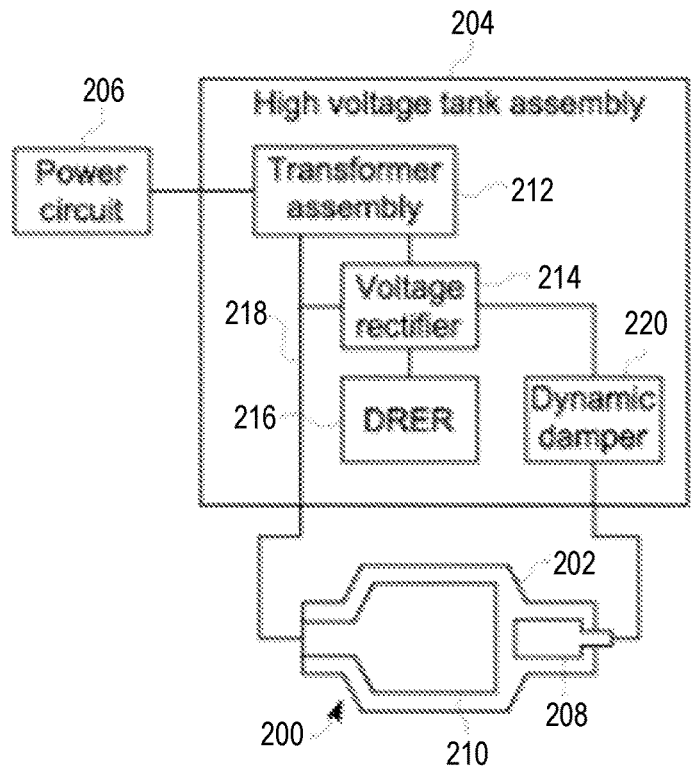
FIG. 2 is a system diagram of an embodiment of an X-ray generator.
Figure 3:
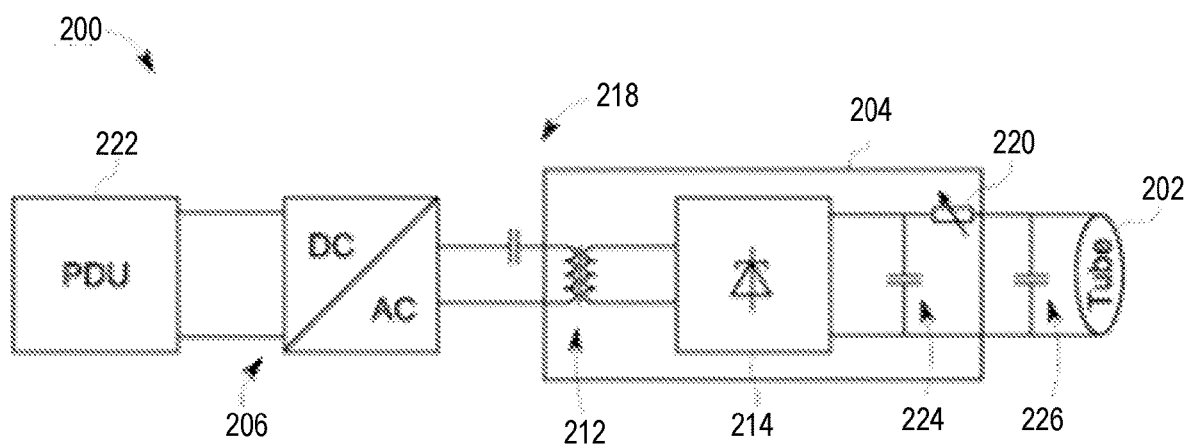
FIG. 3 is a schematic diagram of an embodiment of an X-ray generator with spit damping.

The following description relates to various embodiments for medical imaging systems. An example medical imaging system is shown in FIG. 1. The medical imaging system of FIG. 1 may be an interventional imaging system including an X-ray generator configured to supply power to X-ray tube. FIG. 2 is a system diagram of an embodiment of an X-ray generator. FIG. 3 is a schematic diagram of an embodiment of an X-ray generator with spit damping. The X-ray generator shown in FIGS. 2 and 3 includes an in-line high voltage (HV) transformer to provide high voltage to the X-ray tube. This in-line configuration may prevent certain degradation modes that may occur due to high-voltage discharges (e.g., whereby large amplitude AC currents can flow through electrically sensitive electronics). In this in-line configuration, electronics to control the cathode are referred to as high voltage electronics and are located between the HV transformer and a HV connector to minimize parasitic capacitance. Traditional layout and geometry of electronics connected to a very high voltage reference are organized on one physical board and protected by a single Faraday cage. While this traditional approach is effective when space is not a premium, it does not allow the use of the "in line HV transformer" geometry and leads to a very complex and convoluted protection features against high voltage discharges.

Figure 4A:
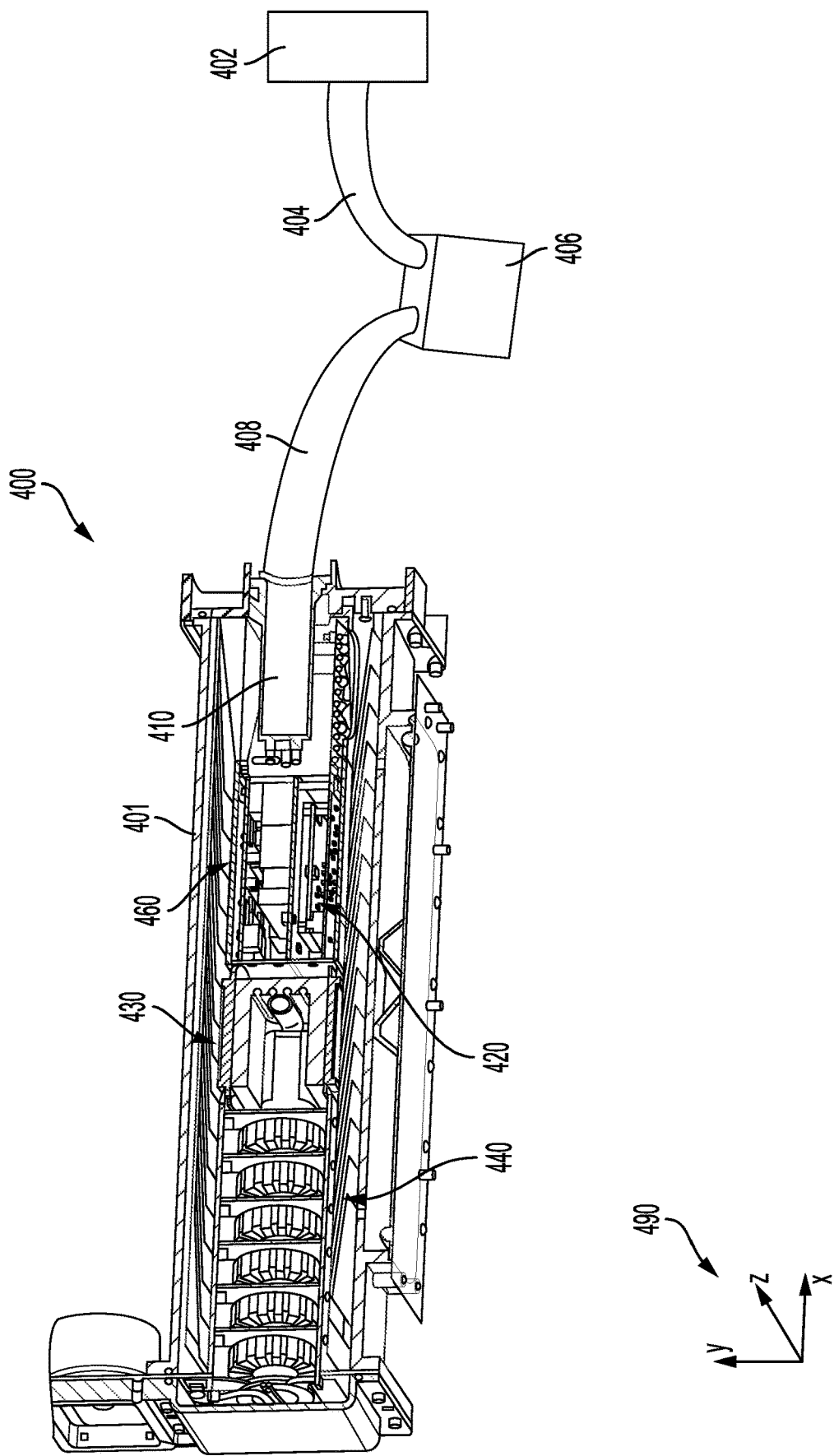
FIG. 4A is a cross-section of an assembly including a plurality of interconnected power boards with a high voltage (HV) connector.
Figure 4B:
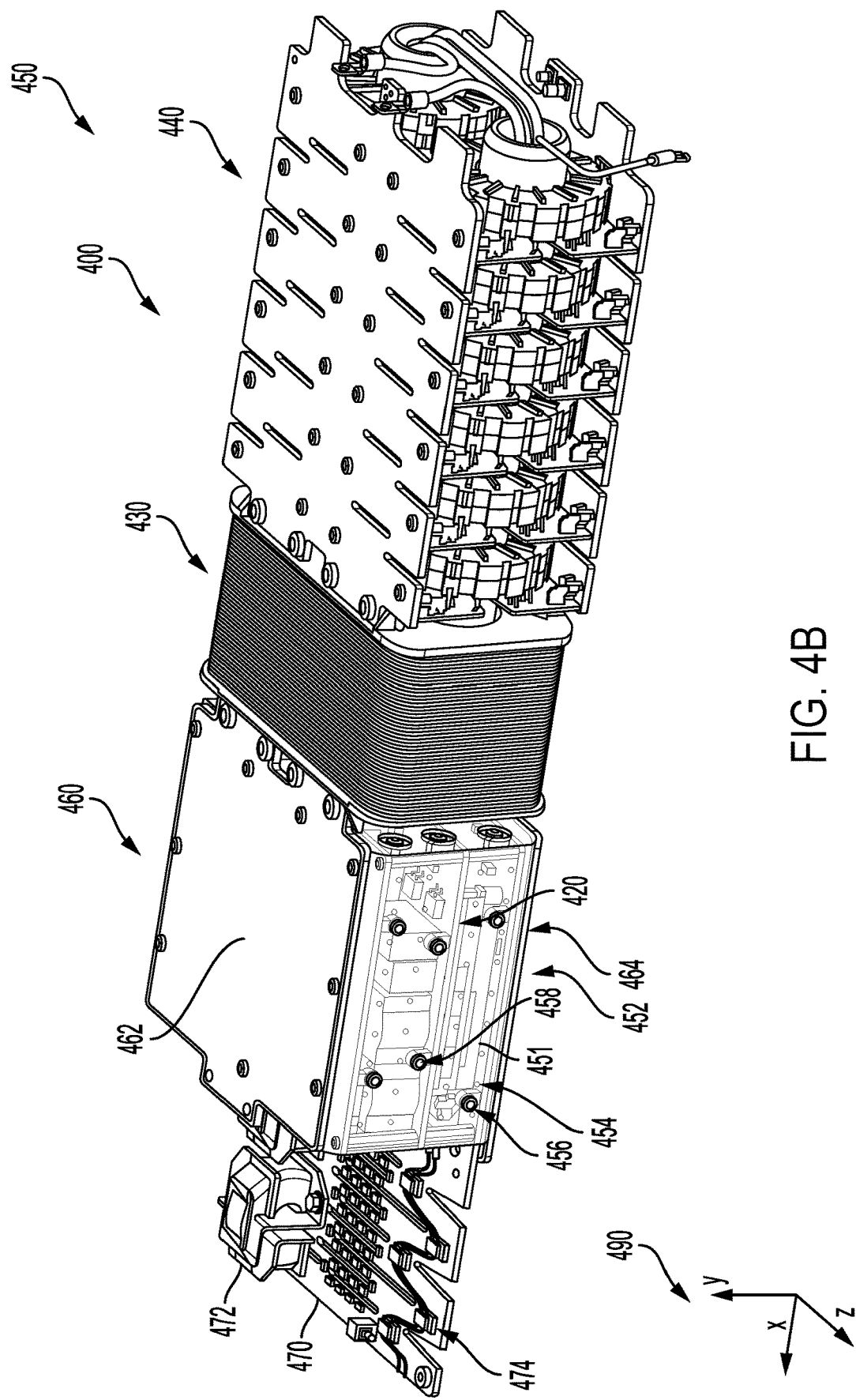
FIG. 4B is a perspective view of the assembly including an outer Faraday cage surrounding a cathode supply assembly.
Figure 8A:
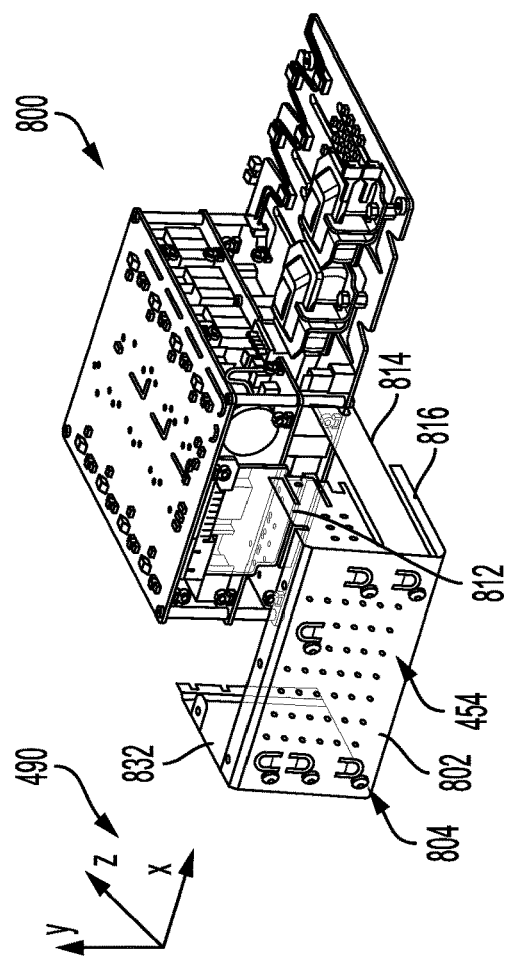
FIGS. 8A and 8B are views of an outer Faraday cage.
Figure 8B:
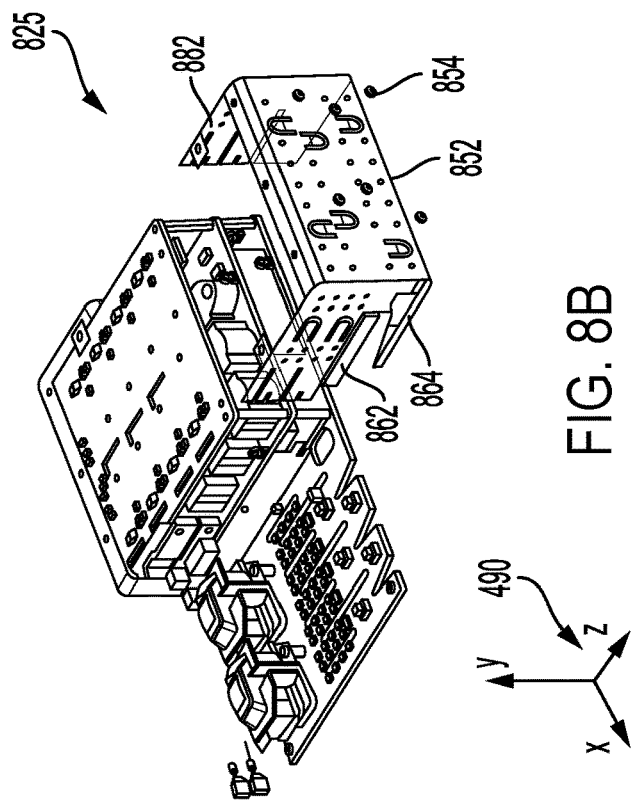
Figure 9:
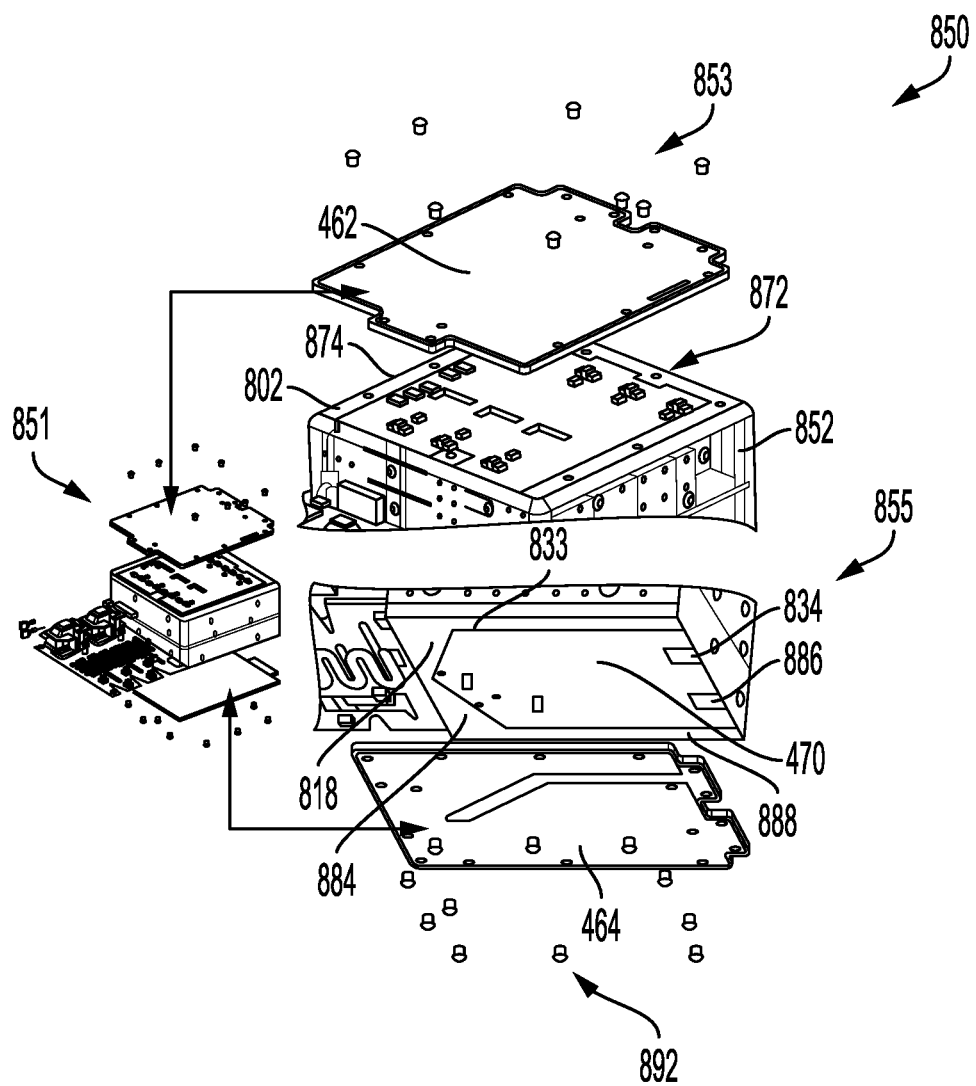
FIG. 9 is a further view of the outer Faraday cage.
Figure 10:
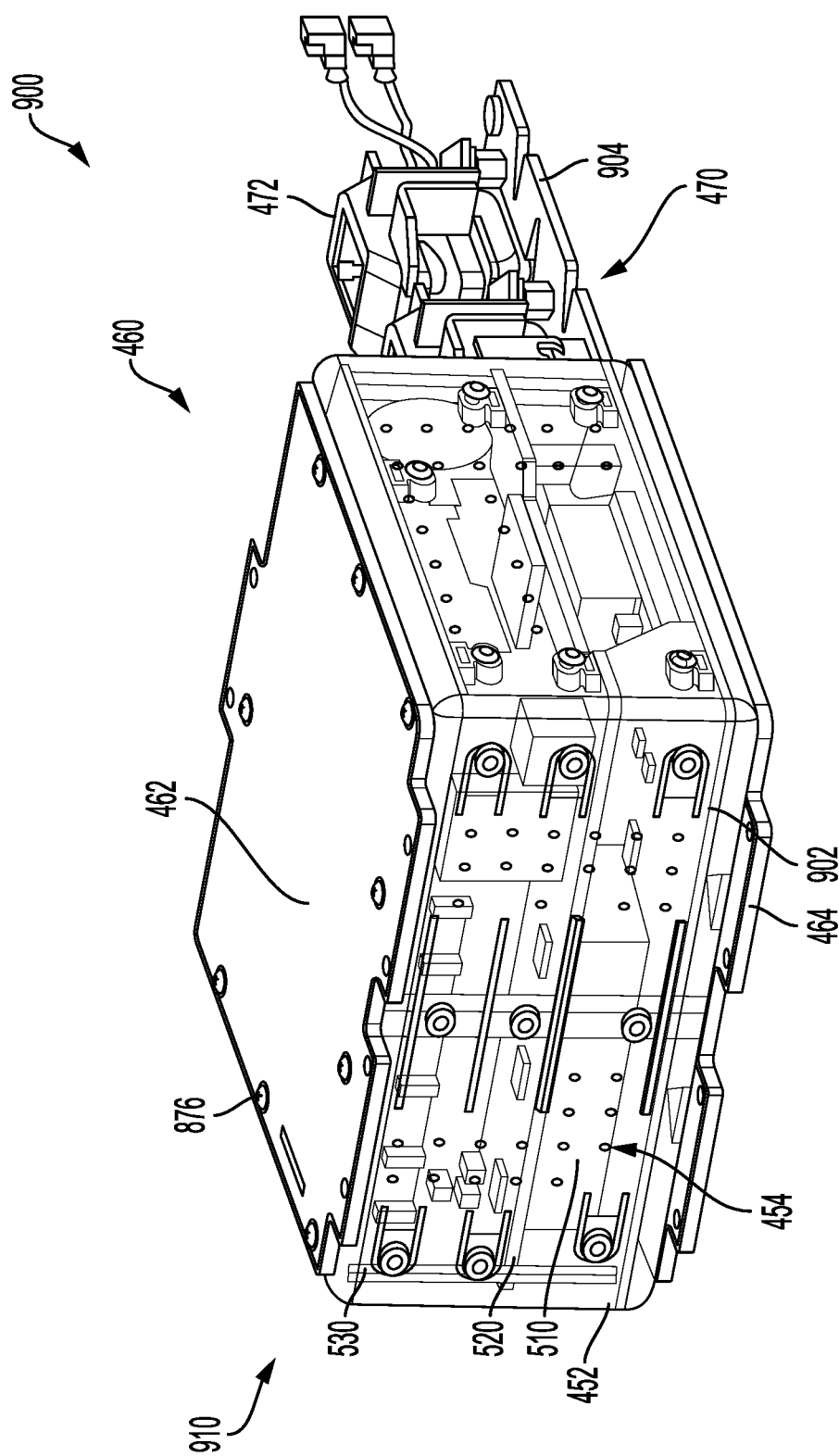
FIG. 10 is a view of the cathode supply assembly with the outer Faraday cage.

Thus, according to embodiments disclosed herein, a modular (3 or more main boards), compact, and robust approach for a mechanical integration of all the functions of a cathode of an interventional system is provided to allow the in-line HV transformer to be realized in practice. A high-voltage (HV) connector may be electrically coupled to an X-ray tube of the medical imaging system. A cross-section of an assembly including the HV connector is shown in FIG. 4A. A perspective view of the assembly is shown in FIG. 4B. The assembly may include a cathode supply (e.g., a cathode control), which is shown in FIGS. 5A and 5B. The cathode supply may include a plurality of digital, analog, and power boards, including at least a first digital board, a first analog board, a second power board, and a third power board. The second power board is shown in FIGS. 6A and 6B. The first digital board and a Faraday cage thereof are shown in FIGS. 7A and 7B. The Faraday cage surrounds the first digital board, which is a sensitive board due to the digital electronics positioned thereon, and which is coupled to the first analog board. A second Faraday cage of the cathode assembly is shown in FIGS. 8A, 8B, and 9. FIG. 10 shows the second Faraday cage surrounding the plurality of boards of the cathode assembly. FIGS. 4A-10 are shown to scale, though other relative dimensions may be used without departing from the scope of this disclosure.

The proposed geometry organizes the cathode electronics on three levels and uses multiple Faraday cages nested within each other, as opposed to previous solutions wherein the cathode electronics are organized on a single board and surrounded by a single Faraday cage. The first digital board surrounded by the inner Faraday cage includes control electronics such as FPGAs, CPLDs, and or CPUs along with other microelectronics components. This first digital board is coupled to the first analog board and these two boards constitute the first level of the geometry (referred to as the control level). The second power board includes power electronics to provide and control the emitter currents and constitutes the second level (referred to as the high power level). The third power board includes power electronics to provide and control the bias/grid voltage to the electrode and constitutes the third level (referred to as the high voltage level). This geometry allows a good separation of the different features of the cathode assembly. Additionally or alternatively, one of the boards may be arranged at an orientation different than an orientation of the other boards to decrease a packaging size of the cathode supply.

The cathode supply assembly includes multiple Faraday cages, such as two or more Faraday cages. In the example shown herein, one digital board (e.g., referred to as a shark board and that includes control electronics such as FPGAs and CPUs) may be surrounded by an inner Faraday cage, and the entire board assembly (e.g., the plurality of boards) may be surrounded by an outer Faraday cage. In other examples, each of the power electronics boards may be surrounded by a respective outer Faraday cage (with the digital board surrounded by the inner Faraday cage). Some of the power electronics boards may be electrically coupled via an interconnecting board. This arrangement may provide a high frequency immunity and mitigates exposure of the boards to high discharge conditions. The interconnecting board provides an inexpensive way to greatly reduce the volume of the cathode electronics and facilitates the assembly, while providing a very robust protection against electrical discharges.

The cathode supply/high voltage assembly illustrated in FIGS. 4A-10 provides for high voltage supply and control to a cathode while facilitating a communication link at 1.25 Gbps with an insulation of 180 kV with the main generator master board. The configuration disclosed herein includes power that is supplied to heat a plurality of emitters (e.g., 3 emitters). The configuration further includes a grid/bias function between 0V to −9 kV and a rise and fall time <50 µs. The configuration includes a HV measurement, is resistant to HV instability, compatible with mineral oil or other fluids, and improves electronic robustness to electromagnetic perturbations.

Additionally, the compact assembly of the cathode supply described herein allows the usage of a dynamic damper network which increases the efficiency of the overall X-ray generator by saving ~2 kW at a tube current of 1 A. The damping network protects the HV transformer and may reduce the energy released during an electrical discharge, but it will not completely eliminate it. The residual energy can still degrade the cathode electronics therefore, as for other products, it is routed away by using a Faraday cage, which prevents the discharge current from going through the cathode electronics.

Referring to FIG. 1, an imaging system 100 including a C-arc 102 (which may be referred to herein as a C-shaped gantry) is schematically shown. Imaging system 100 may be referred to herein as a medical imaging system and/or C-arc imaging system. The imaging system 100 includes a radiation source, and in the examples described herein, the radiation source is an X-ray unit 108 (which may be referred to herein as an X-ray tube) positioned opposite to detector 130 (which may be referred to herein as an X-ray detector) and configured to emit X-ray radiation. In other examples, the radiation source may be configured to emit a different type of radiation for imaging (e.g., imaging a subject, such as patient 134), such as gamma rays, and the detector (e.g., X-ray detector 130) may be configured to detect the radiation emitted by the radiation source (e.g., X-ray beam 132). The imaging system 100 additionally includes base unit 105 supporting imaging system 100 on ground surface 190 on which the imaging system 100 sits (e.g., via base 122 supported by wheel 124, wheel 126, etc.).

The C-arc 102 includes a C-shaped portion 103 connected to an extended portion 107, with the extended portion 107 rotatably coupled to the base unit 105. The detector 130 is coupled to the C-shaped portion 103 at a first end 150 of the C-shaped portion 103, and the X-ray unit 108 is coupled to the C-shaped portion 103 at an opposing, second end 152 of the C-shaped portion 103. As an example, the C-arc 102 may be configured to rotate at least 180 degrees in opposing directions relative to the base unit 105. The C-arc 102 is rotatable about at least a rotational axis 164 and may additionally rotate about axis 167. The C-shaped portion 103 may be rotated as described above in order to adjust the X-ray unit 108 and detector 130 (positioned on opposite ends of the C-shaped portion of the C-arc 102 along axis 166, where axis 166 intersects rotational axis 164 and extends radially relative to rotational axis 164) through a plurality of positions.

During an imaging operation (e.g., a scan), a portion of a patient's body placed in an opening formed between the X-ray unit 108 and detector 130 may be irradiated with radiation from the X-ray unit 108. For example, patient 134 may be supported by a patient support table 136, with the patient support table 136 including a support surface 138 and base 140, and may be arranged between the X-ray unit 108 and the detector 130. The X-ray unit 108 includes an X-ray tube insert 109 and X-ray radiation generated by the X-ray tube insert 109 may emit from the X-ray unit 108. The radiation may penetrate the portion of the patient's body arranged to be irradiated and may travel to the detector 130 where the radiation is captured (e.g., intercepted by a detector surface 113 of the detector 130). By penetrating the portion of the patient's body placed between the X-ray unit 108 and detector 130, an image of the patient's body is captured and relayed to an electronic controller 120 of the imaging system 100 (e.g., via an electrical connection line, such as electrically conductive cable 161). The image may be displayed via display device 118. Images of the subject acquired by the imaging system 100 via the X-ray unit 108 and the detector 130 as described above may be referred to herein as projection images and/or scan projection images.

The base unit 105 may include the electronic controller (e.g., a control and computing unit) that processes instructions or commands sent from the user input devices during operation of the imaging system 100. The base unit 105 may also include an internal power source (not shown) that provides electrical power to operate the imaging system 100. Alternatively, the base unit 105 may be connected to an external electrical power source to power the imaging system 100. A plurality of connection lines (e.g., electrical cables, such as electrically conductive cable 161) may be provided to transmit electrical power, instructions, and/or data between the X-ray unit 108, detector 130, and the control and computing unit. The plurality of connection lines may transmit electrical power from the electrical power source (e.g., internal and/or external source) to the X-ray unit 108 and detector 130.

The C-arc 102 may be adjusted to a plurality of different positions by rotation of the C-shaped portion 103 of the C-arc 102. For example, in an initial, first position shown by FIG. 1, the detector 130 may be positioned vertically above the X-ray unit 108 relative to a ground surface 190 on which the imaging system 100 sits, with axis 166 arranged normal to the ground surface 190 intersecting a midpoint of each of the outlet 111 of X-ray unit 108 and detector surface 113 of detector 130. The C-arc 102 may be adjusted from the first position to a different, second position by rotating the C-shaped portion 103. In one example, the second position may be a position in which the X-ray unit 108 and detector 130 are rotated 180 degrees together relative to the first position, such that the X-ray unit 108 is positioned vertically above the detector 130, with axis 166 intersecting the midpoint of the outlet 111 of the X-ray unit 108 and the midpoint of the detector surface 113 of the detector 130. When adjusted to the second position, the X-ray unit 108 may be positioned vertically above the rotational axis 164 of the C-shaped portion 103 of the C-arc 102, and the detector 130 may be positioned vertically below the rotational axis 164. Different rotational positions of the C-arc 102 are possible.

FIG. 2 is a system diagram of an embodiment of an X-ray generator 200. In the embodiment depicted in FIG. 2 and as described in detail herein, the X-ray generator 200 includes a high voltage source and a radiation source which is exemplarily an X-ray tube 202 electrically coupled in a conventional manner to a high voltage tank assembly 204 so as to create an emission of X-rays from the X-ray tube 202. While the high voltage tank assembly 204 is depicted as including various components located therein, alternative embodiments may include more or fewer components located within the high voltage tank assembly 204 in an arrangement additional to that as depicted herein. The X-ray generator 200 further includes a power circuit 206 which is coupled to the high voltage tank assembly 204 and configured to supply power to drive the high voltage tank assembly 204.

The X-ray tube 202 generally includes a cathode 208 and an anode 210. The cathode 208 and anode 210 are arranged in a generally opposing alignment along a longitudinal axis of the X-ray tube 202. The cathode 208 includes one or more electron-emitting filaments that are capable in a conventional manner of emitting electrons. A filament heating current controls the number of electrons boiled off by the filament and thus provides control of the tube current flow. The high voltage potential applied by the high voltage tank assembly 204 causes acceleration of the electrons from the cathode 208 towards the anode 210. The accelerated electrons contact the anode 210, producing electromagnetic radiation, including X-radiation.

The high voltage tank assembly 204 is configured to receive an AC waveform from the power circuit 206 and condition the AC waveform to provide a high voltage DC potential to the X-ray tube 202 where the anode 210 and the cathode 208 usually carry equal voltages of different polarity. In some examples, cathode 208 may be unipolar, where both the gridding voltage and the biasing voltage are of a single polarity (negative). The high voltage tank assembly 204 includes a transformer assembly 212 and a voltage rectifier circuit 214. The transformer assembly 212 and the voltage rectifier circuit 214 of the high voltage tank assembly 204 condition the AC voltage signal transferred by the power circuit 206.

The voltage rectifier 214 is connected to a distributed resonant energy recovery (DRER) circuit 216. The DRER circuit 216, as described in further detail, herein can store and restore energy to the X-ray tube 202 between a high kV level (e.g. 140 kV) and a low kV level (e.g. 80 kV). The DRER circuit 216 further promotes efficiency by reusing and recirculating energy when switching between the voltage levels which conserves energy and allows faster switching.

The transformer assembly 212 and voltage rectifier 214 provide the high voltage energy to the X-ray tube necessary to generate X-rays. This high voltage energy can be between two or more output energy levels. In one example the energy can be switched between zero and 120 kV, while in another embodiment, the energy can be switched between 80 kV and 140 kV. However, other energy levels or combinations of two or more energy levels are possible without departing from the scope of this disclosure.

In some examples, temporary electrical short circuits sometimes occur inside of an X-ray tube which are generally referred to as tube-spit. During tube-spit recovery no X-ray photons are emitted from the X-ray tube. As disclosed herein, a dynamic damper 220 may be provided between the cathode 208 of the X-ray tube 202 and the voltage rectifier 214. The dynamic damper 220 provides an impedance against the short circuit of the tube-spit to limit the value of the in-rush current and protect components. The dynamic damper 220 has a frequency variable impedance to provide a high impedance in response to the high frequency characteristic of tube-spit while providing a low impedance during the normal operation, including normal X-ray generator operational frequencies and working frequencies of the energy storage system.

In some examples, the X-ray generator 200 may further include the DRER circuit 216 connected to the voltage rectifier 214. An energy recovery system, for example, the DRER circuit 216, can help to provide the switching of the energy between two or more energy levels by speeding up the transition between the energy levels by storing and returning energy. In embodiments, this may be provided as resonant switching of the voltage generated by the transformer and voltage rectifier to the X-ray tube 202 between a high kV level (e.g. 140 kV) and a low kV level (e.g. 80 kV). The DRER circuit 216 may operate to switch the load on an output capacitor to transfer energy from the output capacitor to a storage capacitor to recover energy from the system when switching between energy levels.

FIG. 3 is a schematic diagram of an embodiment of the X-ray generator 200 with tube-spit damping. The X-ray generator 200 includes the power circuit 206 that receives electrical main power from a power distribution unit (PDU) 222. The PDU 222 provides the external input power to the power circuit 206. In some examples, the PDU 222 provides power at an exemplary 50 Hz input frequency. The power circuit 206 may include a frequency converter which produces a high frequency input power signal to the transformer assembly 212. The high frequency input power signal may have a frequency between 50 kHz to 250 kHz. The high frequency input power signal includes an AC component and a DC component to provide both the input voltage for the high voltage tank assembly 204 to develop the high voltage potentials necessary to generate the X-rays. The power from the power circuit is provided into the high voltage tank assembly 204 and the transformer assembly 212 located therein.

As described above, the transformer assembly 212 and voltage rectifier 214 generate the high voltage potentials required by the X-ray tube to generate X-rays. Particularly, in dual energy (DE) or multiple energy (ME) X-ray applications, the transformer assembly 212 and voltage rectifier 214 are capable of generating multiple voltage levels across the X-ray tube 202. In some examples, one or more of the frequency converter, transformer assembly 212, and voltage rectifier 214 comprise a high voltage generator 218 of the X-ray generator 200. A filtering capacitor 224 is provided in parallel to the voltage rectifier 214. An output capacitor 226 is arranged in parallel to the X-ray tube 202 and controls the voltage applied across the X-ray tube 202 and stores potential for recapture and reuse. In embodiments, the capacitance of the output capacitor 226 may at least partly comprise of the capacitance of a high voltage cable linking the high voltage generator and the X-ray tube. The capacitance of the output capacitor may be greater than that of the filtering capacitor 224.

In some examples, the high voltage cable may be cable 161 of FIG. 1, the X-ray tube 202 may be included in the X-ray unit 108, and the high voltage generator (e.g., high voltage tank assembly 204) may be included in the base unit 105. In some examples, the high voltage generator (e.g., the high voltage tank assembly 204) may be included in a separate housing that can be positioned distal from the C-shaped portion 103 (e.g., in a cabinet) and coupled to the X-ray unit 108 via cable 161 and an extension of cable 161 (e.g., as shown in FIG. 4A and described in more detail below).

As explained above, the dynamic damper 220 is located between the X-ray tube 202 and the voltage rectifier 214. As explained above, tube-spit is a high frequency phenomenon of short circuits within the X-ray tube 202. Tube-spit can occur at a frequency about 10 MHz, although typically tube-spit has a fundamental frequency higher than 20 MHz. A high impedance provided by dynamic damper 220 at these frequencies protects the system against the occurrence of tube-spit. However, a high damping impedance reduces the efficiency of energy recovery. Therefore, a dynamic damper 220 which produces a frequency-variable impedance can provide a low impedance at low frequencies associated with operation of the X-ray generator 200, including embodiments with energy storage systems as described herein while providing a high impedance when high frequency tube-spit phenomenon occurs. This arrangement achieves both improved tube-spit protection, as well as improved energy recovery, particularly in systems that use resonant switching.

Thus, the X-ray generator described above may include an X-ray tube including one or more emitters from which an electron beam is emitted toward a target. The emitter is a part of a cathode (e.g., cathode 208) and the target is an anode (e.g., anode 210), with the target at a substantially higher positive voltage (which may be at ground) than the emitter (which may be at a negative voltage). Electrons from the emitter may be formed into a beam and directed or focused by electrodes (used to set the local electric field on the emitting structure) and/or magnets which are also parts of the cathode. In response to the electron beam impinging the target, the target emits X-rays. The voltage supplied to the electrodes of the cathode may be controlled in order to adjust the intensity or energy of X-rays that are generated. In these systems, with respect to controlling the emitter, it is desirable to be able to produce fast transitions from low to high voltages, as well as to control voltage waveforms on electrodes voltage values to control the electron beam.

As explained above, the cathode may be unipolar, as opposed to more commonly used bipolar cathodes. In bipolar cathodes, a gridding voltage is of a first polarity (e.g., negative) and a biasing voltage may be of an opposite polarity (e.g., positive or negative). Additionally, driving electronics of the cathode may be connected through a cable that may vary in length, from around 0.5 m to around 40 m. Thus, typical electronics for controlling the cathode may be configured for bipolar cathodes and/or shorter cables. Approaches for controlling a cathode through a shorter cable may be less effective when applied to a cathode controlled through a longer cable. Further, it may be desirable to move the electronics that control the cathode (e.g., the driving electronics) away from the cathode and in the high voltage tank assembly, for example, to reduce the size of the cathode.

For example, prior solutions included various electronics on a single board and placed in a Faraday cage located along the long side of the HV transformer where one end is in close proximity to the high voltage terminal and the other one is in close proximity with the lower voltage side. The drawback of this solution is that the locations of the parasitic capacitances between sides of the Faraday cage and the sides of the HV transformer are non-negligible and, if the same geometry is applied to in an X-ray generator as disclosed herein (e.g., with a unipolar cathode and/or with a long cable), may lead to quick degradation when electrical discharges occur.

High voltage discharges (short-circuit inside the X-ray tube) create high frequency (~100 MHz) large amplitude AC currents that flows to ground through the HV cable, damping resistor/network and, if not properly managed, through electrically sensitive electronics. The role of the damping resistor/network is to greatly decrease the magnitude of the discharge current. Prior solutions may lead to large parasitic capacitances positioned such that the damping resistor/network can be completely bypassed by the discharge current. The electronics will be damaged by the undamped AC current. Thus, an "in line HV transformer," used along with a dynamic damper having a frequency dependent impedance to reduce losses in the damping resistor, may eliminate this degradation mode. Further, according to embodiments disclosed herein and explained in more detail below, the electronics may be organized and various Faraday cages used such that the "in line HV transformer" concept can be implemented in practice. The solution proposed is modular, which may allow the solution to be applied in various types of imaging systems (e.g., computed tomography, X-ray imaging, fluoroscopy), robust, inexpensive, and easy to manufacture.

Turning now to FIG. 4A, it shows an example of a power device 400 (e.g., a tank in an X-ray generator) with an inline high voltage (HV) transformer. The power device 400 may be coupled to an X-ray tube 402. In one example, the X-ray tube 402 may be a non-limiting example of the X-ray tube 202 of FIG. 2. In one example, the power device 400 may be arranged in and/or may be a non-limiting example of the HV tank assembly 204 of FIG. 2. The power device 400 shown in FIG. 4A is a cross-sectional view taken along the x-axis of the view of the power device 400 shown in FIG. 4B.

An axis system 490 is shown comprising an x-axis parallel to a lateral direction, a y-axis parallel to an axial direction, and a z-axis parallel to a transverse direction and normal to the x- and y-axes. In one example, the lateral direction is a horizontal direction and the axial direction is a vertical direction.

The power device 400 includes a plurality of components housed within a housing 401 (e.g., a tank assembly housing), including a high voltage (HV) connector 410. A first cable 404 may extend from the x-ray tube 402 to a junction box 406. The first cable 404 may include a first length. A second cable 408 may extend from the junction box 406 to the HV connector 410. The second cable 408 may include a second length. The second length may be greater than the first length. In one example, the second length is at least twice as long as the first length. The first cable 404 and the second cable 408 may be electrically coupled to one another. The first cable 404 and the second cable 408 may collectively form a high-voltage cable. The first cable 404 may be a non-limiting example of the cable 161 of FIG. 1. In some examples, the first cable 404 may have a length of up to 15 m and the second cable 408 may have a length of up to 30 m. In some examples, the high-voltage cable may have an overall length in a range of 10-40 m. Additionally or alternatively, the first cable 404 may include a first gauge and the second cable 408 may include a second gauge. In one example, the first gauge and the second gauge are equal. Additionally or alternatively, the first gauge may be less than or greater than the second gauge.

The power device 400 includes a cathode supply assembly 460 that includes a plurality of boards 420. The cathode supply assembly 460 may be housed in housing 401 and may be in electric connection with the HV connector 410. The plurality of boards 420 may include multiple interconnected boards. The plurality of boards 420 may include electronics (power electronics components, field-programmable gate arrays (FPGAs), complex programmable logic devices (CPLDs), and/or central processing units (CPUs)) configured to control power output from a HV transformer 440 that is also housed within housing 401.

In one example, the plurality of boards 420 may include four boards, organized in way that decreases a packaging space of the assembly. The plurality of boards 420 may provide modularity, increase the performance and the manufacturability of the power device 400 when compared to previous examples. In one example, a first digital board, a first analog board, and a second power board of the plurality of boards 420 may be arranged in a first orientation based on a direction in which electronics of the boards face. A third power board of the plurality of boards 420 may be arranged in a second orientation, different than the first orientation. In one example, the third power board is upside-down relative to the first digital board, the first analog board, and the second board. The plurality of boards is described in greater detail below.

A dynamic damper 430 may be arranged between the plurality of boards 420 and the HV transformer 440 within the housing 401. In one example, the dynamic damper 430 may increase the efficiency of the power device 400. In one example, a combination of the dynamic damper and the plurality of boards 420 may circumvent high discharge currents that degrade electronic components. In one example, the shape and packaging of the plurality of boards 420 being in line with the HV transformer 440 may stop high voltage discharge currents from contacting electronics of the plurality of boards 420. The HV transformer 440 is a non-limiting example of the transformer assembly 212 and the dynamic damper 430 is a non-limiting example of the dynamic damper 220.

Turning now to FIG. 4B, it shows a perspective view 450 of the power device 400. As such, components previously introduced are similarly numbered in this and subsequent figures. The housing 401 of FIG. 4A is omitted from the perspective view 450 to allow visualization of the internal components. As illustrated, a height of a cathode supply assembly 460, which includes the plurality of boards 420, is substantially equal to a height of the dynamic damper 430. Additionally or alternatively, a height of the HV transformer 440 is substantially equal to heights of each of the cathode supply assembly 460 and the dynamic damper 430. As will be described herein, at least two boards of the plurality of boards 420 may be arranged complementarily to one another to decrease a packaging size of the cathode supply assembly 460 while accommodating different electric potentials of the at least two boards.

The cathode supply assembly 460 may include an outer Faraday cage 452. The outer Faraday cage 452 may include four sides, including front side 451. In the view of FIG. 4B, the front side 451 of the outer Faraday cage 452 is transparent to allow internal electronics to be visible behind the outer Faraday cage. The outer Faraday cage 452 may surround the sides of the plurality of boards 420. The outer Faraday cage 452 may include a top side 462 and a bottom side 464. The top side 462 and the bottom side 464 may each be printed wiring board that, in some examples, have been metalized. In one example, the top side 462, the bottom side 464, and the four sides (including the front side 451) of the outer Faraday cage 452 may shape an enclosure that houses the plurality of boards 420. The enclosure may be fully sealed apart from a plurality of perforations 454 arranged in the outer Faraday cage 452. The plurality of perforations 454 may admit coolant, such as oil, into the enclosure. The coolant may thermally modulate the electric components of the plurality of boards 420. The outer Faraday cage 452 may be comprised of a conductive material, such as aluminum alloy.

The outer Faraday cage 452 may be mounted to the cathode supply assembly 460 via a plurality of fasteners 456 mating with a plurality of eyelets 458 mounted to the plurality of boards 420 (explained in more detail below). The plurality of eyelets 458 may limit overpotentiation of one or more of the plurality of boards 420 while still allowing use of the plurality of fasteners 456, which may simplify a manufacturing process.

The cathode supply assembly 460 may further include a first analog board 470. A portion of the first analog board 470 may be arranged outside of the outer Faraday cage 452, and therefore outside of the enclosure. In this way, a portion of the first analog board 470 may be arranged within the outer Faraday cage 452 while a remaining portion of the first analog board 470 is arranged outside of the outer Faraday cage 452. For example, a board of the plurality of boards 420 may be coupled to the portion of the first analog board 470 that is within the outer Faraday cage 452. The remaining portion of the first analog board 470 may be spaced away from the board of the plurality of boards 420 and outside of the outer Faraday cage 452.

The first analog board 470 may include a transformer 472 and an optical fiber network 474. In one example, the first analog board 470 may be configured to control HV discharge, measure HV discharge, and provide communication between various devices of the medical imaging system. The transformer 472 may be configured to transfer power from an external board to the first analog board 470 and hence the cathode supply assembly 460. A connector (not shown in FIG. 4B, but shown in FIGS. 5A and 6A and described in more detail below) may transfer the voltage from the HV transformer 440 to the HV connector (e.g., HV connector 410 of FIG. 4A). The optical fiber network 474 may communicate between the inside of the tank and the outside of the tank. In one example, the power device 400 is arranged in the HV tank assembly 204 of FIGS. 2 and 3. The optical fiber network 474 may include optical fiber cables and mounts therefor for providing direct communication channels between components inside and outside of the HV tank.

A height, measured along the y-axis, of the cathode supply assembly 460 may be equal to or less than a height of the HV transformer 440. The height of the cathode supply assembly 460 may be reduced via an arrangement of each board of the plurality of boards 420 as discussed above and described in greater detail below, relative to previous examples.

Turning now to FIGS. 5A and 5B, they show opposite perspective views of the cathode supply assembly 460 with the outer Faraday cage 452 omitted. FIG. 5A shows a first view 500 from a first side of the cathode supply assembly 460. FIG. 5B shows a second view 550 from a second side of the cathode supply assembly 460, the second opposite to the first side. FIGS. 5A and 5B are described in tandem here.

A configuration of the plurality of boards 420 is shown. The plurality of boards 420 may include the first analog board 470, a first digital board 510, a second power board 520, and a third power board 530. Each of the first analog board 470, the first digital board 510, the second power board 520, and the third power board 530 is parallel to a x-z plane. As such, each of the plurality of boards 420 is parallel to one another. Additionally or alternatively, a size and a shape of the second power board 520 and the third power board 530 may be identical. Each of the first digital board 510, the second power board 520, and the third power board 530 may include a square or rectangular shape. In some examples, the first digital board 510 may be smaller than the second power board 520 and the third power board 530. In FIG. 5B, the first digital board 510 is positioned behind an inner Faraday cage 540, which is shown as being partially transparent to allow visualization of the first board 510.

The first digital board 510 is a shark board, in one example. The first digital board 510 may be configured to control elements of the cathode supply assembly 460. The second power board 520 is an emitter board, in one example. The second power board 520 may be configured to control the voltage and the temperature of the emitter elements (e.g., filaments) of the cathode. The third power board 530 is a grid board, in one example. The third power board 530 may be configured to modulate and control a bias voltage to the cathode (e.g., the bias voltage may be applied to a gridding electrode of the cathode to switch the cathode on) and stabilize a focal spot of the generated X-ray beam.

The cathode supply assembly 460 may include a plurality of fastening elements to secure the outer Faraday cage 452 to the plurality of boards. The fastening elements may include eyelets that are configured to interface with screws or other fasteners, as described herein. However, it is to be appreciated that other types of fastening elements may be used without departing from the scope of this disclosure. The plurality of eyelets 458 (shown in FIG. 4B) may include a plurality of first eyelets 512, a plurality of second eyelets 522, and a plurality of third eyelets 532. The plurality of first eyelets 512 may be coupled to the portion of the first analog board 470 adjacent to the first digital board 510. The plurality of second eyelets 522 may be coupled to the second power board 520. The plurality of third eyelets 532 may be coupled to the third power board 530. In one example, each eyelet of the plurality of first eyelets 512 and the plurality of second eyelets 522 extends in a first direction and each eyelet of the plurality of third eyelets 532 extends in a second direction, opposite the first direction. For example, the eyelets of the plurality of first eyelets 512 extend toward the second power board 520 and the eyelets of the plurality of second eyelets 522 extend toward the third power board 530. The eyelets of the plurality of third eyelets 532 extend toward the second power board 520.

The plurality of boards 420 may be supported by a plurality of columns including a first plurality of columns 502 and a second plurality of columns 504. The first plurality of columns 502 may be arranged between the first analog board 470 and the second power board 520, creating a first gap between the first analog board 470 and the second power board 520. The second plurality of columns 504 may be arranged between the second power board 520 and the third power board 530, creating a second gap between the second power board 520 and the third power board 530. A number, a size, and a shape of the first plurality of columns 502 may be identical to a number, a size, and a shape of the second plurality of columns 504. The first eyelets 512 may be arranged in the first gap. The second eyelets 522 and the third eyelets 532 may be arranged in the second gap. A third plurality of columns 513 may be arranged between the first analog board 470 and the first digital board 510, to mount the first digital board 510 to the first analog board 470.

The first digital board 510 and the first analog board 470 may each include electronic devices mounted thereto that extend in the first direction along the positive y-axis into the first gap. The second power board 520 may include electronic devices mounted thereto that extend in the first direction into the second gap. As such, the first digital board 510, the first analog board 470, and the second power board 520 are mounted in a first orientation.

The third power board 530 may include electronic devices mounted thereto that extend in the second direction, along the negative y-axis, into the second gap. As such, the third power board may be mounted in a second orientation, different than the first orientation. In one example, the third power board 530 may be "upside-down" relative to the first digital board 510 and the second power board 520. Said another way, the first digital board 510 may have a first mounting surface on which the electronic devices of the first digital board 510 are coupled, the second power board 520 may have a second mounting surface on which the electronic devices of the second power board 520 are coupled, and the third power board 530 may have a third mounting surface on which the electronic devices of the third power board 530 are coupled. The electronic devices on the first mounting surface may extend upward from the first mounting surface along the positive y direction (e.g., the electronics of the first board may face a bottom, non-mounting surface of the second board). Likewise, the electronic devices on the second mounting surface may extend upward from the second mounting surface along the positive y direction. However, the electronic devices on the third mounting surface may extend downward from the third mounting surface along the negative y direction. In this way, the third mounting surface may face the second mounting surface (e.g., the electronics of the second power board may face the mounting surface of the third power board and the electronics of the third power board may face the mounting surface of the second power board). The first analog board may be arranged similarly to the first digital board and the second power board, e.g., the electronics of the first analog board may face a bottom, non-mounting surface of the first digital board and/or the bottom, non-mounting surface of the second power board.

In one example, a potential of the first digital board 510 and/or the first analog board 470 is identical to a potential of the second power board 520. A potential of the third power board 530 may be different than the potential of the first digital board 510 and the second power board 520. The electronic devices mounted on the second power board 520 and the third power board 530 may be complementarily arranged such that the electronic devices of the boards do not touch while reducing a packaging size of the cathode supply assembly 460. In this way, the electronic devices of both the second power board 520 and the third power board 530 may be arranged between the second power board 520 and the third power board 530.

The plurality of boards 420 may be communicatively coupled via an interconnecting board 560, which is shown in a partially-transparent view in FIG. 5A to allow visualization of components located behind the interconnecting board 560. The interconnecting board 560 may include multiple connection points that interface with connections points of the plurality of boards 420. The first analog board 470 includes a first connection point 514 that couples to a first end of the interconnecting board 560. The second power board 520 includes a plurality of second connection points 524 that couple to a mid-section of the interconnecting board 560. The third power board 530 includes a third connection point 534 that coupled to a second end of the interconnecting board 560, the second end opposite to the first end. The interconnecting board 560 may be configured to transfer signals and power between the plurality of boards 420.

The interconnecting board 560 thereby electrically connects the first analog board 470 to both the second power board 520 and the third power board 530. The interconnecting board 560 addresses multiple challenges associated with the arrangement disclosed herein, including small signals integrity (shielding), creepage distance with high voltage signals (1.5 kV), support power up to 500 W, and mineral oil compatibility.

The second power board 520 may include a connector 570 that is configured to transfer power from the HV transformer 440 (via the cathode supply assembly 460) to the X-ray tube (e.g., to the cathode). The connector 570 may provide one common voltage (HV voltage), three emitter currents, and one grid/bias voltage (electrode voltage to turn the electrode on or off) to the X-ray tube.

An inner Faraday cage 540 may be arranged in the first gap (e.g., between the first analog board 470 and the second power board 520). The inner Faraday cage 540 may surround an entirety of the first digital board 510. The inner Faraday cage 540 may include a cubical or a rectangular prism shape. The inner Faraday cage may include a plurality of perforations 542. The plurality of perforations 542 may be configured to admit coolant directly to the first digital board 510. In one example, the inner Faraday cage 540 surrounds only the first digital board 510 such that the second power board 520, the third power board 530, and the first analog board 470 are arranged outside of the inner Faraday cage 540. The inner Faraday cage 540 may surround the first digital board 510 and portions of wires and other electric components extending therefrom.

The inner Faraday cage 540 may be nested within the outer Faraday cage (e.g., outer Faraday cage 452 of FIG. 4B). The outer Faraday cage and the inner Faraday cage 540 may block certain electromagnetic fields from contacting the plurality of boards 420.

Thus, the cathode supply assembly 460 may include a plurality of boards (e.g., power boards/printed circuit boards) stacked vertically relative to each other. For example, the plurality of boards may include an analog board (e.g., the first analog board), a digital board (e.g., the first digital board), and two power boards (e.g., a second power board and a third power board). The analog board may be the vertically-lowest board and the third power board may be the vertically highest board, such that the digital board, the second power board, and the third power board are positioned vertically above the analog board. For example, the y-axis may extend in the positive y direction (in the direction of the arrow of the y axis) away from ground, and the plurality of boards may be stacked in an order of the analog board, the digital board, the second power board, and the third power board in the positive y direction. The digital board may be positioned vertically closer to the analog board that the second power board, and the second power board may be positioned vertically closer to the analog board than the third power board. The digital board, the second power board, and the third power board, as well as a portion of the analog board, may be surrounded by an outer Faraday cage, and the digital board may be surrounded by an inner Faraday cage within the outer Faraday cage.

Each of the first analog board, the first digital board, the second power board, and the third power board may extend in respective x-z planes (e.g., parallel to ground), such that the first analog board, the first digital board, the second power board, and the third power board all extend in parallel to each other. The cathode supply assembly 460 may include an interconnecting board configured to electrically couple the second power board and the third power board to the first analog board (wherein the first digital board is directly electrically coupled to the first analog board without a coupling via the interconnecting board). The interconnecting board may extend in a x-y plane and thus the interconnecting board may extend perpendicular to the first analog board, the first digital board, the second power board, and the third power board. The interconnecting board may be surrounded by the outer Faraday cage.

The cathode supply assembly may be housed within a high voltage tank assembly that includes a HV transformer, dynamic damper/damping network, and HV connector. The HV connector may be coupled to a HV cable that is electrically connected to an X-ray tube (e.g., a cathode of the X-ray tube). The HV connector/cable may be configured to supply voltage in a range of 80-140 kV to the X-ray tube. The cathode supply assembly may be configured to control the cathode of the X-ray tube, including control of the electron flux of the cathode. By including the cathode supply assembly in the high voltage tank assembly, the X-ray tube/cathode may be smaller in size, which may reduce the torque needed to rotate the X-ray unit around the patient (as discussed above with respect to FIG. 1), reduce the likelihood of collisions between the X-ray unit and the patient or clinicians, and provide other benefits. However, including the cathode supply assembly in the high voltage tank presents challenges, owing to the small space available in the high voltage tank assembly and the risk of degradation should a short circuit occur (as explained above). By arranging the electronics of the cathode supply assembly onto four boards that are vertically stacked and surrounded by a Faraday cage, the cathode supply assembly may have a smaller footprint that allows it to fit within the high voltage tank assembly and may be protected should a short circuit occur.

FIG. 6A shows a detailed view 600 of the second power board 520. The plurality of second connection points 524 may include a first second board connection point 612 and a second second board connection point 614. The interconnecting board 560 may include a first mid connection point 622 and a second mid connection point 624. The first mid connection point 622 may interface with the first second board connection point 612. The second mid connection point 624 may interface with the second second board connection point 614. The interconnecting board 560 may couple to the second connection point 524 when moved along the positive z-axis in a third coupling direction. In some examples, two first second board connections may be provided, each configured to interface with a respective first mid connection point on the connecting board.

The second power board 520 may include a cutout 630 complementary to a shape of the interconnecting board 560. By doing this, the interconnecting board 560 may be parallel to an x-y plane when coupled to each of the plurality of boards (e.g., the plurality of boards 420 of FIGS. 5A and 5B).

As further shown in FIG. 6A, the second power board 520 may include a plurality of electronic devices 601 coupled to the second mounting surface of the second board 520. The plurality of electronic devices 601 may extend vertically upward from the second power board 520. The electronic devices of the plurality of electronic devices 601 may be of varying heights, with some electronic devices have a larger height than others. The electronic devices may be arranged such that the second power board 520 includes one or more regions with taller/higher electronic devices and one or more regions with shorter/lower electronic devices. The electronic devices coupled to the third power board 530 may likewise have varying heights, and the electronic devices coupled to the third power board 530 may be arranged such that the third power board 530 includes one or more regions with taller/higher electronic devices and one or more regions with shorter/lower electronic devices. When the third power board 530 is coupled to the second power board 520 as shown in FIGS. 5A and 5B, a region of the third power board 530 with taller electronic devices may be aligned with a region of the second power board 520 with shorter electronic devices, and a region of the third power board 530 with shorter electronic devices may be aligned with a region of the second power board 520 with taller electronic devices. This complementary arrangement (e.g., whereby the taller electronic devices of the third power board may fill space left by the shorter electronic devices of the second power board) may allow an overall height of the assembly to be lowered.

FIG. 6B shows an assembly step 625 illustrating the second power board 520 with the interconnecting board 560 coupled thereto being coupled to the first analog board 470. It is to be appreciated that the first digital board 510 has already been mounted to the first analog board 470 and is surrounded by the inner Faraday cage 540 in FIG. 6B. The second power board 520 and the interconnecting board 560 may be moved along the negative y-axis when being coupled to the first analog board 470 in a first coupling direction. The interconnecting board 560 may include a first connecting end 626 that interfaces with the first connection point 514. As illustrated, the first connection point 514 is arranged at an end of the first analog board 470 opposite to the first digital board 510 and the inner Faraday cage 540.

Turning now to FIGS. 7A and 7B, they show views 650 and 675, respectively, of the first digital board 510 and the inner Faraday cage 540. The inner Faraday cage 540 may be physically coupled to first board nuts 654 on the first digital board 510 via a plurality of fasteners 652. Additionally or alternatively, the first digital board 510 may be mounted to the first analog board 470 via the third plurality of columns 513. A portion of the plurality of fasteners 652 may engage with the first board nuts 654 and another portion may engage with the plurality of third columns 513. It is to be appreciated that the inner Faraday cage 540 may be comprised, along a bottom side, of the first analog board 470. As explained previously, the first digital board 510 may include electronic devices such as FPGAs and CPUs. Further, the first digital board 510 may include an electrical connector 655 that couples with a corresponding electrical connector of the first analog board 470.

FIGS. 8A and 8B and FIG. 9 show an assembly process of the outer Faraday cage 452 assembled to surround the plurality of boards 420. A first assembly step 800 illustrates a first outer Faraday cage portion 802 being coupled to the plurality of eyelets via a plurality of fasteners 804.

The first outer Faraday cage portion 802 may include an upper arm 812, a mid arm 814, and a lower arm 816. The upper arm 812 may include a first length measured along the z-axis and a first height measured along the y-axis. The upper arm 812 may further include perforations of the plurality of perforations 454. The mid arm 814 may include a second length measured along the z-axis and a second height measured along the y-axis. The second length may be greater than the first length. The second height may be less than the first height. The lower arm 816 may include a third length measured along the z-axis and a third height measured along the y-axis. The third length may be greater than the first length and less than the second length. The third height may be less than each of the first and second heights. The upper arm 812 and the mid arm 814 may include through holes for receiving fasteners of the plurality of fasteners 804.

Turning now to FIG. 8B, it shows a second assembly step 825 including a second outer Faraday cage portion 852 being coupled to the plurality of eyelets via a plurality of fasteners 854. In this way, the outer Faraday cage 452 of FIG. 4B may be modular and comprise two separate Faraday cages. Additionally, the second outer Faraday cage portion 852 may include arms that interface with the upper arm 812, the mid arm 814, and the lower arm 816.

The second outer Faraday cage portion 852 may include a first arm 862 with a fourth length and a fourth height. In one example, the fourth height is greater than the first height. The fourth height may position the first arm 862 to completely overlap with the upper arm 812 and a portion of the mid arm 814. The first arm 862 may include slots that may align with the through holes of the upper arm 812. Fasteners may extend through the through holes and the slots and thread with eyelets. The second outer Faraday cage portion 852 may further include a second arm 864 with a fifth length and a fifth height. The first length may be less than the second length and the fourth length and similar to the first length. The second arm 864 may overlap with a portion of the mid arm 814 and may include a through hole that aligns with a through hole of the mid arm 814. A fastener may extend through the through hole and physically couple the arms to an eyelet.

The first outer Faraday cage portion 802 may further include an opposite first outer Faraday cage portion arm 832 extending from an extreme end of the first outer Faraday cage portion 802 opposite an extreme end from which the top, mid, and lower arms 812, 814, and 816 extend. The opposite first outer Faraday cage portion arm 832 may include a sixth length and a sixth height. The sixth length may be less than the second length and greater than the first length. The sixth height may be greater than a sum of each of the first, second and third heights. In one example, the sixth height is equal to a height of the first outer Faraday cage portion 802.

The second outer Faraday cage portion 852 may include an opposite second outer Faraday cage portion arm 882. The opposite second outer Faraday cage portion arm 882 may be identical to the opposite first outer Faraday cage portion arm 832 in size and shape. The opposite second outer Faraday cage portion arm 882 and the opposite first outer Faraday cage portion arm 832 may be complementary to one another such that they overlap with one another and include overlapping through holes that allow one or more fasteners to physically couple the arms to eyelets.

Each of the arms of the first and second outer Faraday cage portions may be substantially rectangular in shape. The first and second outer Faraday cage portions are asymmetric. The arms may be different in shape and size to accommodate different electronic components and/or couplings in the cathode supply assembly.

FIG. 9 shows a third assembly step 850 for physically coupling the top side 462 and the bottom side 464 to the first and second outer Faraday cage portions 802, 852. FIG. 9 includes a miniaturized exploded view 851 of the assembly with the top and bottom sides removed from the remainder of the assembly. FIG. 9 further includes a first magnified view 853 of the top side 462 and a top portion of the assembly and a second magnified view 855 of the bottom side 464 and bottom of the assembly. The first magnified view is a top perspective view while the second magnified view is a bottom perspective view.

In one example, the first and second outer Faraday cage portions 802, 852 may include tabs 872 extending from arms thereof. Each of the tabs 872 may include threaded through holes for engaging with a threaded fastener. The first and second outer Faraday cage portions 802, 852 may further include a strips 874, that extend in a direction normal to the arms. The strips 874 may include threaded through holes configured to engage with a threaded fastener.

The top side 462 may be physically coupled to the first and second outer Faraday cage portions 802, 852 via a plurality of fasteners 876. The plurality of fasteners 876 may engage with the through holes of the tabs 872 and the strips 874. In this way, the top side 462 may be directly coupled to the first and second outer Faraday cage portions 802, 852.

The bottom side 464 may be physically coupled to each of the first analog board 470, the first outer Faraday cage portion 802 and the second outer Faraday cage portion 852.

In one example, the lower arm 816 may include a flange 818 that extends inwardly over the portion of the first analog board 470. The flange 818 may include through holes that align with through holes of the first analog board 470. The opposite first outer Faraday cage portion arm 832 may include a tab 834 that extend toward the flange 818. In this way, the flange 818 and the tab 834 may overlap with the first analog board 470. A strip 833 may extend from the flange 818 to the opposite first outer Faraday cage portion arm 832. The strip 833 and the tab 834 may include through holes that align with through holes of the first analog board 470.

The opposite second outer Faraday cage portion arm 882 is identical to the opposite first outer Faraday cage portion arm 832. The opposite second outer Faraday cage portion arm 882 includes a flange 884, a tab 886, and a strip 888 extending between the flange 884 and the tab 886.

The bottom side 464 may physically couple to the opposite first and second outer Faraday cage portion arms 832, 882, and to the first analog board 470 via a plurality of bolts 892. In this way, the plurality of boards 420 and the portion of the first analog board 470 may be sealed, excluding the perforations 454 of the outer Faraday cage 452, via the outer Faraday cage 452, the top side 462, and the bottom side 464.

FIG. 10 shows an embodiment 900 of the cathode supply assembly 460 in a fully assembled configuration. The outer Faraday cage 452 forms a box shape (e.g., a cube shape or a rectangular prism shape) that encloses an entirety of the first digital board 510, the second power board 520, and the third power board 530. As described above, the first analog board 470 may include a portion 902 that extends within the enclosure and is also housed by the outer Faraday cage 452.

In one example, the outer Faraday cage 452 shapes a housing 910 that encloses a portion of the cathode supply assembly 460. The inner Faraday cage 540 may be nested in an interior space of the housing 910. Also arranged within the interior space of the housing 910 are the plurality of boards 420 and their corresponding electronics and the portion 902 of the first analog board 470 on which the first digital board 510 is mounted. The remaining portion 904 of the first analog board 470 is arranged outside of the housing 910 and comprises the transformer 472 and the optical fiber network. As illustrated, the plurality of perforations 454 extend around an entirety of the outer Faraday cage 452. The top side 462 and the bottom side 464 may be free of perforations such that the cathode supply assembly 460 is sealed at its top and bottom.

In this way, a medical imaging system includes an HV tank with an electronic assembly included therein, wherein the electronic assembly is used to control a cathode of an X-ray tube. To have the tank have an in-line configuration (to improve tank robustness), in order to fit inside the tank, the electronic assembly includes a specific cathode assembly with a plurality of vertically-stacked boards and at least two Faraday cages nested within one another. The nested Faraday cages are configured in order to surround the respective boards/electronics while providing openings as small as possible for the connectors and PCBs which have to go outside the respective Faraday cage.

FIGS. 1 and 4A-10 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below/underneath one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The disclosure also provides support for an electronic assembly configured to control a cathode of an X-ray tube of a medical imaging system, the electronic assembly comprising: a plurality of boards comprising a first analog board, a first digital board, a second power board, and a third power board, and at least two Faraday cages nested within one another, the at least two Faraday cages comprising an inner Faraday cage surrounding the first digital board and an outer Faraday cage surrounding each of the plurality of boards and the inner Faraday cage. In a first example of the assembly, electronics of the second power board face electronics of the third power board. In a second example of the assembly, optionally including the first example, the first digital board is coupled to the first analog board, a portion of the first analog board is surrounded by the outer Faraday cage, and a remaining portion of the first analog board extends outside of the outer Faraday cage. In a third example of the assembly, optionally including one or both of the first and second examples, the portion of the first analog board, the first digital board, the second power board, and the third power board are vertically stacked. In a fourth example of the assembly, optionally including one or more or each of the first through third examples, the assembly further comprises: an interconnecting board coupled to the first analog board, the second power board, and the third power board. In a fifth example of the assembly, optionally including one or more or each of the first through fourth examples, the inner Faraday cage is coupled to the first analog board. In a sixth example of the assembly, optionally including one or more or each of the first through fifth examples, each of the inner Faraday cage and outer Faraday comprises a plurality of perforations. In a seventh example of the assembly, optionally including one or more or each of the first through sixth examples, the outer Faraday cage is physically coupled to the second power board and the third power board via a plurality of eyelets and a plurality of fasteners.

The disclosure also provides support for a cathode supply assembly for a medical imaging system, comprising: a housing, a plurality of boards interconnected by an interconnecting board, the plurality of boards and the interconnecting board arranged within an interior volume of the housing, and an inner Faraday cage surrounding a first digital board of the plurality of boards, wherein an outer Faraday cage of the housing surrounds each of the first digital board, a second power board, and a third power board of the plurality of boards. In a first example of the assembly, the first digital board, the second power board, and the third power board are vertically stacked such that electronics of the second power board face the third power board, and electronics of the third power board face the second power board. In a second example of the assembly, optionally including the first example, the first digital board is mounted to a portion of a first analog board extending into the housing. In a third example of the assembly, optionally including one or both of the first and second examples, the first analog board comprises a remaining portion that is arranged outside of the housing, the remaining portion comprising a transformer. In a fourth example of the assembly, optionally including one or more or each of the first through third examples, each of the first digital board, the first analog board, the second power board, and the third power board extend in respective planes parallel to each other, wherein the interconnecting board extends in a plane perpendicular to the respective planes, and wherein the interconnecting board is electrically coupled to the first analog board, the second power board, and the third power board. In a fifth example of the assembly, optionally including one or more or each of the first through fourth examples, the plurality of boards is electrically coupled to a cathode via a cable. In a sixth example of the assembly, optionally including one or more or each of the first through fifth examples, the cathode is unipolar and wherein the cable has a length in a range of 10-40 m.

The disclosure also provides support for a medical imaging system, comprising: a cathode supply assembly, a high-voltage (HV) transformer, a dynamic damper, and a HV connector coupled to an X-ray tube, wherein the dynamic damper is arranged between the HV transformer and the cathode supply assembly, wherein a housing of the cathode supply assembly comprises an outer Faraday cage, a plurality of boards is enclosed by the housing, the plurality of boards comprising a first digital board, a second power board, and a third power board, a first analog board extends under the plurality of boards and a portion of the first analog board is within the housing, and an inner Faraday cage encloses the first digital board and is arranged within an interior volume of the housing. In a first example of the system, electronics of the first digital board extend from the first digital board upward along a vertical axis, wherein electronics of the second power board extend from the second power board upward along the vertical axis, and wherein electronics the third power board extend downward from the third power board along the vertical axis. In a second example of the system, optionally including the first example, the outer Faraday cage is formed from a plurality of pieces comprising a first outer Faraday cage portion physically coupled to a second outer Faraday cage portion, a top side, and a bottom side, wherein the top side is positioned above the third power board and the bottom side is positioned below the first analog board and wherein the second power board and the third power board are outside of the inner Faraday cage. In a third example of the system, optionally including one or both of the first and second examples, one or more of the inner Faraday cage and the outer Faraday cage comprises a plurality of perforations. In a fourth example of the system, optionally including one or more or each of the first through third examples, a height of the housing is equal to a height of the HV transformer, and wherein the HV transformer, the cathode supply assembly, the dynamic damper, and the HV connector are housed in a high voltage tank assembly housing. As used herein, the term "approximately" is construed to mean plus or minus five percent of the range unless otherwise specified.

As used herein, an element or step recited in the singular and preceded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. An electronic assembly configured to control a cathode of an X-ray tube of a medical imaging system, the electronic assembly comprising:
    a plurality of boards comprising a first analog board, a first digital board, a second power board, and a third power board; and
    at least two Faraday cages nested within one another, the at least two Faraday cages comprising an inner Faraday cage surrounding the first digital board and an outer Faraday cage surrounding each of the plurality of boards and the inner Faraday cage.

2. The electronic assembly of claim 1, wherein electronics of the second power board face electronics of the third power board.

3. The electronic assembly of claim 1, wherein the first digital board is coupled to the first analog board, a portion of the first analog board is surrounded by the outer Faraday cage, and a remaining portion of the first analog board extends outside of the outer Faraday cage.

4. The electronic assembly of claim 3, wherein the portion of the first analog board, the first digital board, the second power board, and the third power board are vertically stacked.

5. The electronic assembly of claim 4, further comprising an interconnecting board coupled to the first analog board, the second power board, and the third power board.

6. The electronic assembly of claim 3, wherein the inner Faraday cage is coupled to the first analog board.

7. The electronic assembly of claim 1, wherein each of the inner Faraday cage and outer Faraday comprises a plurality of perforations.

8. The electronic assembly of claim 1, wherein the outer Faraday cage is physically coupled to the second power board and the third power board via a plurality of eyelets and a plurality of fasteners.

9. A cathode supply assembly for a medical imaging system, comprising:
    a housing;
    a plurality of boards interconnected by an interconnecting board, the plurality of boards and the interconnecting board arranged within an interior volume of the housing; and
    an inner Faraday cage surrounding a first digital board of the plurality of boards, wherein an outer Faraday cage of the housing surrounds each of the first digital board, a second power board, and a third power board of the plurality of boards.

10. The cathode supply assembly of claim 9, wherein the first digital board, the second power board, and the third power board are vertically stacked such that electronics of the second power board face the third power board, and electronics of the third power board face the second power board.

11. The cathode supply assembly of claim 9, wherein the first digital board is mounted to a portion of a first analog board extending into the housing.

12. The cathode supply assembly of claim 11, wherein the first analog board comprises a remaining portion that is arranged outside of the housing, the remaining portion comprising a transformer.

13. The cathode supply assembly of claim 12, wherein each of the first digital board, the first analog board, the second power board, and the third power board extend in respective planes parallel to each other, wherein the interconnecting board extends in a plane perpendicular to the respective planes, and wherein the interconnecting board is electrically coupled to the first analog board, the second power board, and the third power board.

14. The cathode supply assembly of claim 9, wherein the plurality of boards is electrically coupled to a cathode via a cable.

15. The cathode supply assembly of claim 14, wherein the cathode is unipolar and wherein the cable has a length in a range of 10-40 m.

16. A medical imaging system, comprising:
    a cathode supply assembly, a high-voltage (HV) transformer, a dynamic damper, and a HV connector coupled to an X-ray tube, wherein the dynamic damper is arranged between the HV transformer and the cathode supply assembly; wherein
    a housing of the cathode supply assembly comprises an outer Faraday cage;
    a plurality of boards is enclosed by the housing, the plurality of boards comprising a first digital board, a second power board, and a third power board;
    a first analog board extends under the plurality of boards and a portion of the first analog board is within the housing; and
    an inner Faraday cage encloses the first digital board and is arranged within an interior volume of the housing.

17. The medical imaging system of claim 16, wherein electronics of the first digital board extend from the first digital board upward along a vertical axis, wherein electronics of the second power board extend from the second power board upward along the vertical axis, and wherein electronics the third power board extend downward from the third power board along the vertical axis.

18. The medical imaging system of claim 16, wherein the outer Faraday cage is formed from a plurality of pieces comprising a first outer Faraday cage portion physically coupled to a second outer Faraday cage portion, a top side, and a bottom side, wherein the top side is positioned above the third power board and the bottom side is positioned below the first analog board and wherein the second power board and the third power board are outside of the inner Faraday cage.

19. The medical imaging system of claim 16, wherein one or more of the inner Faraday cage and the outer Faraday cage comprises a plurality of perforations.

20. The medical imaging system of claim 16, wherein a height of the housing is equal to a height of the HV transformer, and wherein the HV transformer, the cathode supply assembly, the dynamic damper, and the HV connector are housed in a high voltage tank assembly housing.

* * * * *